United States Patent
Ueda

(10) Patent No.: US 11,945,222 B2
(45) Date of Patent: Apr. 2, 2024

(54) FILM FORMING METHOD AND FILM FORMING DEVICE

(71) Applicant: Tetsuto Ueda, Kanagawa (JP)

(72) Inventor: Tetsuto Ueda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 13 days.

(21) Appl. No.: 17/581,978

(22) Filed: Jan. 24, 2022

(65) Prior Publication Data

US 2022/0258466 A1  Aug. 18, 2022

(30) Foreign Application Priority Data

Feb. 12, 2021  (JP) ................. 2021-021106

(51) Int. Cl.
*B41J 2/14* (2006.01)
*B41J 2/045* (2006.01)

(52) U.S. Cl.
CPC ......... *B41J 2/1433* (2013.01); *B41J 2/04581* (2013.01)

(58) Field of Classification Search
CPC ......... B41J 2/1433; B41J 2/04581; B41J 2/14
See application file for complete search history.

(56) References Cited

U.S. PATENT DOCUMENTS

| 2005/0140704 A1* | 6/2005 | Mitsunaga | B41J 11/008 347/5 |
| 2006/0092203 A1 | 5/2006 | Drake et al. | |
| 2019/0255857 A1* | 8/2019 | Hachmann | B41J 2/04586 |
| 2020/0207120 A1* | 7/2020 | Yoshinuma | B41J 11/00242 |

FOREIGN PATENT DOCUMENTS

| DE | 10 2016 221 745 A1 | 5/2018 |
| JP | 2006-130922 | 5/2006 |
| JP | 2013-237167 A | 11/2013 |
| JP | 2014-094454 | 5/2014 |

OTHER PUBLICATIONS

Partial European Search Report dated Jun. 24, 2022 in European Patent Application No. 22151930.9, 21 pages.

* cited by examiner

*Primary Examiner* — Jason S Uhlenhake
(74) *Attorney, Agent, or Firm* — XSENSUS LLP

(57) ABSTRACT

A film forming method includes applying liquids to a material by discharging the liquids from each of a plurality of discharge heads disposed along a transport direction of the material. Each of the discharge heads has a plurality of liquid discharge nozzles disposed along a direction intersecting the transport direction. The applying includes applying at least a first liquid, a second liquid, and a third liquid from each of the plurality of discharge heads. The second liquid is applied to a position substantially equal to a position to which the first liquid is applied along a width direction. The third liquid is applied to an intermediate position between the position to which the first liquid is applied and the position to which the second liquid is applied along the transport direction, the intermediate position being different from the position to which the first liquid is applied along the width direction.

11 Claims, 11 Drawing Sheets

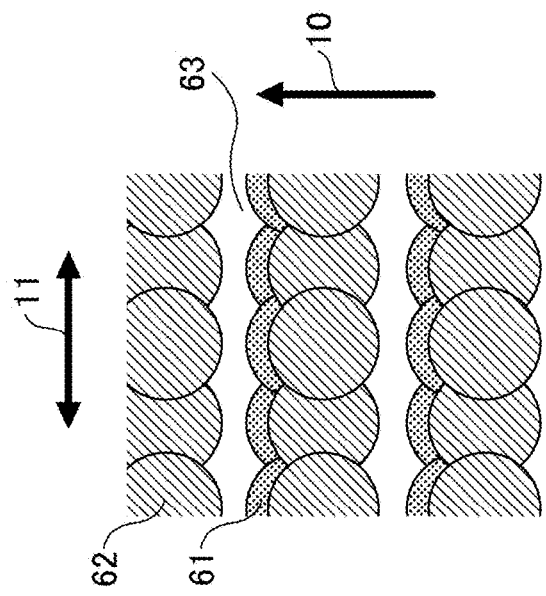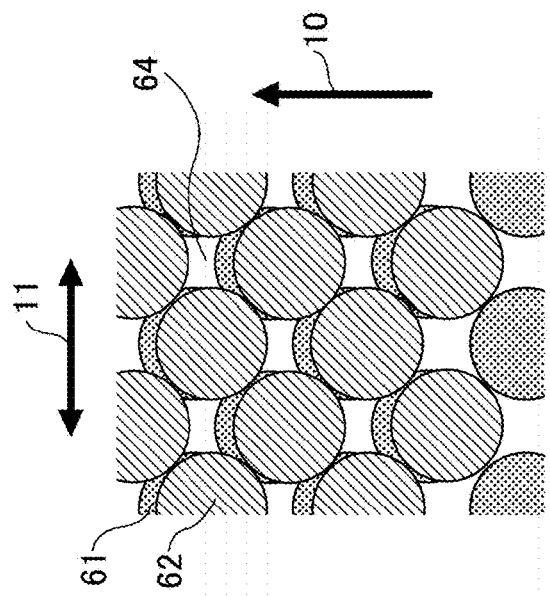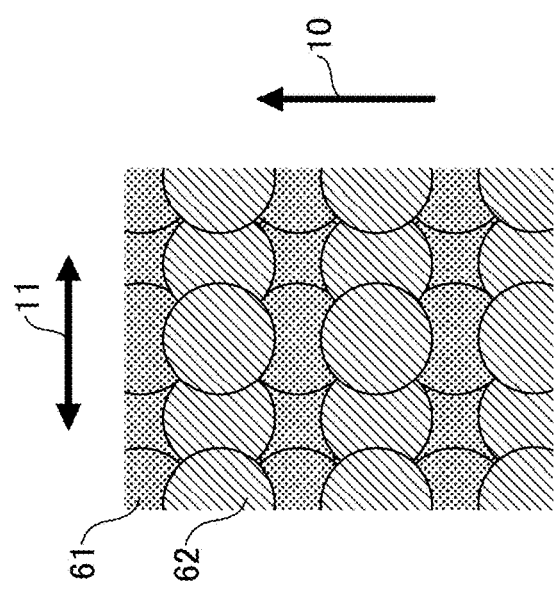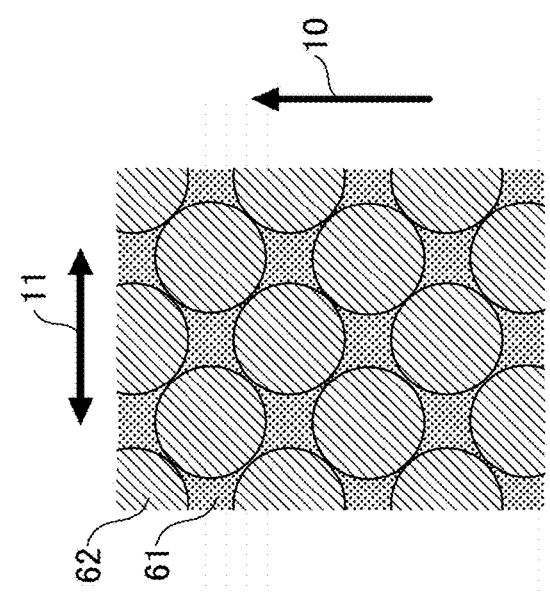

FIG.9A
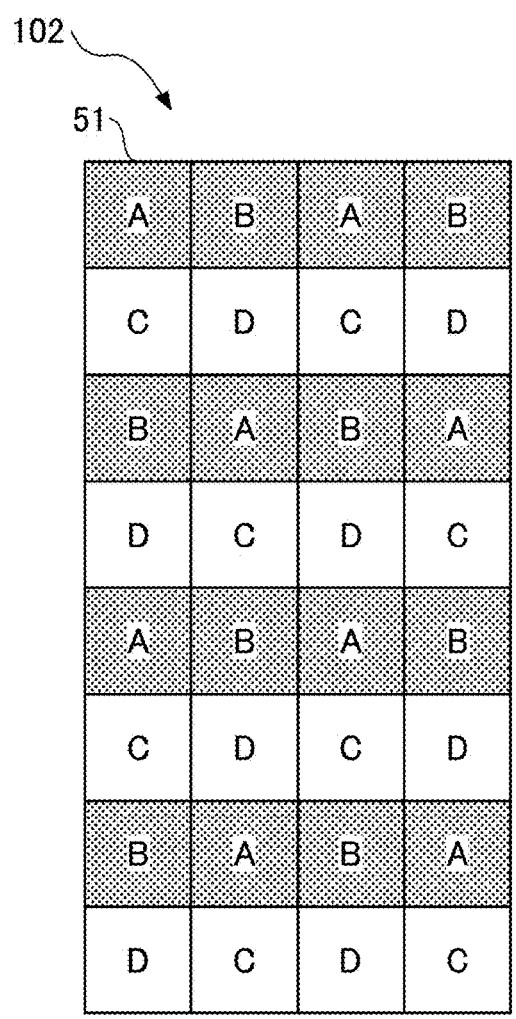
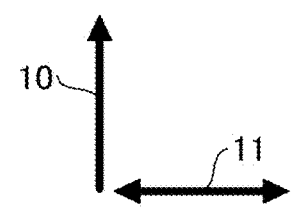
FIG.9B
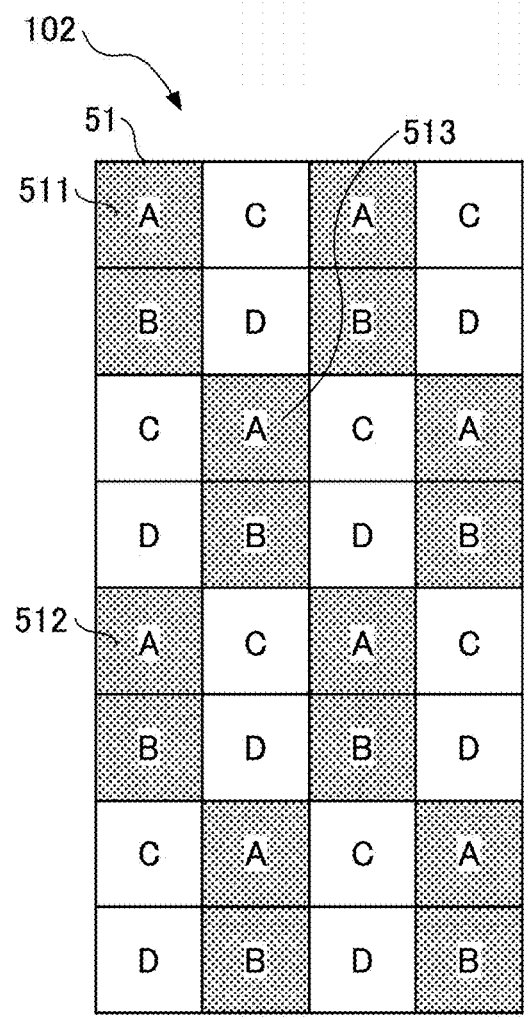
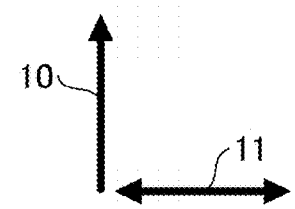

FIG.10
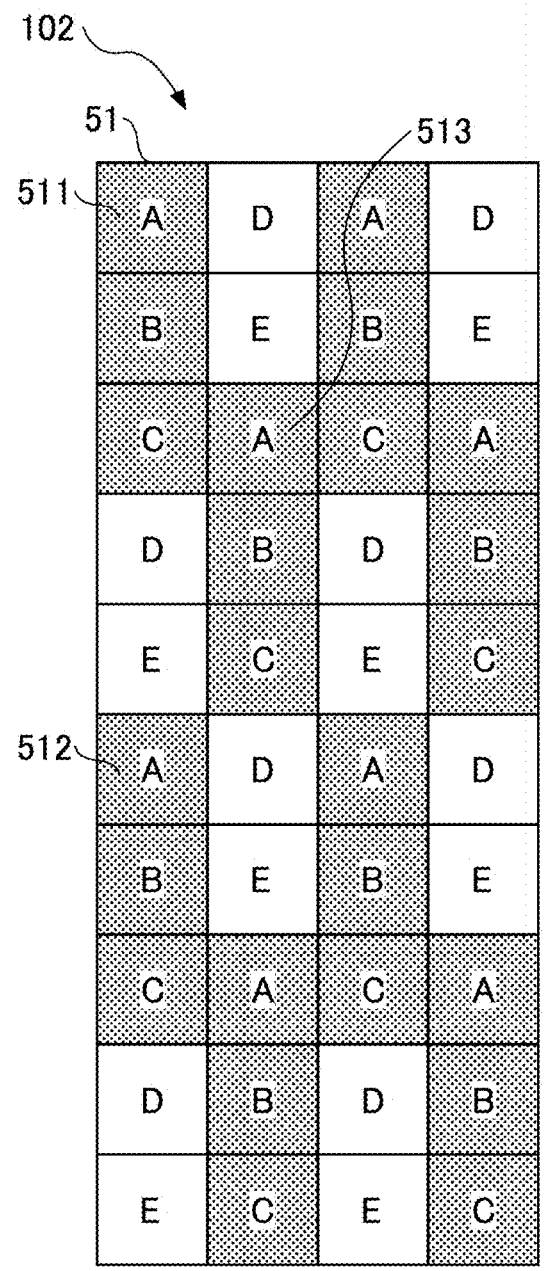
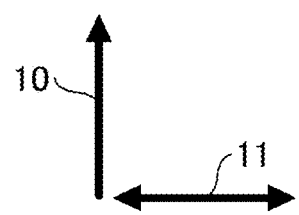

FILM FORMING METHOD AND FILM FORMING DEVICE

CROSS-REFERENCE TO RELATED APPLICATION

The present application is based on and claims priority under 35 U.S.C. § 119 to Japanese Patent Application No. 2021-021106, filed on Feb. 12, 2021, the content of which is incorporated herein by reference in its entirety.

BACKGROUND OF THE INVENTION

1. Field of the Invention

The disclosures discussed herein relate to a film forming method and a film forming device.

2. Description of the Related Art

The related art techniques disclose a known film forming method for forming a film on a material to be coated.

The related art techniques also disclose a method using a printhead for use in an inkjet printer that prints a plurality of pixels on a recording medium in a single pass in a complementary printing mode. Such an inkjet printer includes first and second nozzle arrays disposed within the printhead such that the nozzle arrays are substantially parallel to each other and the nozzle positions are aligned in a printing process direction (see, for example, Patent Document 1).

RELATED ART DOCUMENT

Patent Document

[Patent Document 1] Japanese Unexamined Patent Publication No. 2006-130922

SUMMARY OF THE INVENTION

According to one aspect of embodiments, a film forming method for forming a film formed on a material to be coated is provided. The film forming method includes
  applying liquids to the material by discharging the liquids from each of a plurality of discharge heads, the plurality of discharge heads being disposed along a transport direction of the material to be transported,
  wherein each of the plurality of discharge heads has a plurality of liquid discharge nozzles disposed along a direction intersecting the transport direction,
  wherein the applying includes applying of at least a first liquid, a second liquid, and a third liquid from each of the plurality of discharge heads,
  wherein the second liquid is applied to a position substantially equal to a position to which the first liquid is applied along a width direction, and
  wherein the third liquid is applied to an intermediate position between the position to which the first liquid is applied and the position to which the second liquid is applied along the transport direction, the intermediate position being different from the position to which the first liquid is applied along the width direction.

BRIEF DESCRIPTION OF THE DRAWINGS

FIGS. 7A to 7D are diagrams illustrating the action provided by the film forming method according to the first embodiment, where FIG. 7A is a diagram illustrating a comparative example, FIG. 7B is a diagram illustrating the application position error in FIG. 7A, FIG. 7C is a diagram illustrating the first embodiment, and FIG. 7D is a diagram illustrating the application position error in FIG. 7C;

FIGS. 9A and 9B are diagrams illustrating examples of an ink application by a film forming method according to a third embodiment;

FIG. 10 is a diagram illustrating an example of an ink application by a film forming method according to a fourth embodiment.

DETAILED DESCRIPTION OF THE PREFERRED EMBODIMENTS

Figure 1:
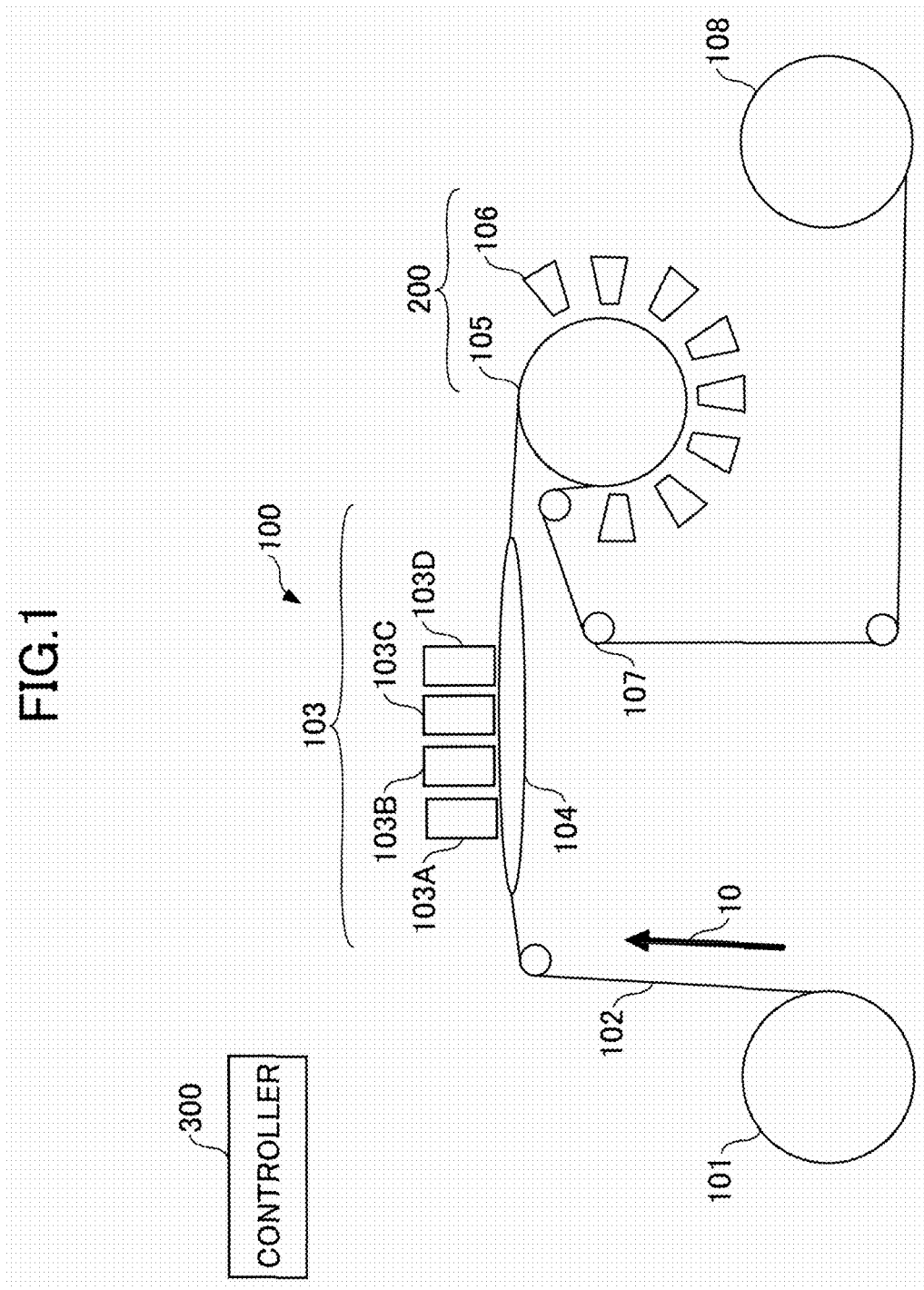
FIG. 1 is a diagram illustrating an example of a configuration of a film forming device according to an embodiment.

However, with respect to the method disclosed in Patent Document 1, when a plurality of discharge units such as printheads is employed to apply liquids, the uniformity of a film to be formed may be improved.

Thus, it is desired to improve the uniformity of a film to be formed.

Hereinafter, embodiments of the invention will be described with reference to the accompanying drawings. In each drawing, the same components are denoted by the same reference numerals, and duplicated descriptions are omitted accordingly.

The following embodiments are merely examples of a film forming method and a film forming device for embodying the technical concept of the present invention, and the present invention is not limited to the following embodiments. The dimensions, materials, shapes, relative layouts, and the like of the components described below are not intended to limit the scope of the invention to the above alone, unless otherwise specified, but are intended to be examples. In addition, the size and positional relationship of the members illustrated in the drawings may be exaggerated for the purpose of clarification.

The film forming method according to the embodiments is to form a film on a material to be coated. Note that the thickness of the film is not particularly limited, and the film may be formed as a layer with respect to the material. Examples of the material to be coated include an electrode substrate (current collector), a power storage device such as a battery, a power generation device such as a fuel cell, a solar power generation device, and the like. The film forming method includes applying a liquid having various materials including powdery active materials and catalyst compositions to a material to be coated, fixing the liquid to the material, and drying the liquid, thereby forming an electrode and the like having a film containing the various materials on the material.

Examples of the film forming method for applying a liquid to the material to form a film include a spraying method, a method using a dispenser, a die coater or pull coating method, or a printing method using an inkjet head.

However, there is a trade-off between the productivity and quality of the above devices, and in response to the demands of market expansion, higher productivity may reduce the positional accuracy of the electrodes and increase the defects, resulting in lower device quality.

For example, when electrodes having a defect at an electrode surface, an electrode end surface, or an electrode interface are shipped to the market without fixing the defect, deposition of a specific material to the defect site, short circuit due to mechanical contact with the electrode interface, leakage, and the like may occur due to aging or vibration, resulting in ignition of the device and decrease of life.

According to the embodiments, the liquid discharged by each of the plurality of discharge heads disposed along the transport direction of the material to be coated to be transported is applied to the material to be coated. Each of the plurality of discharge heads has a plurality of liquid discharge nozzles disposed along a width direction intersecting the transport direction to discharge the liquid.

In the application step, each of the plurality of discharge heads applies a first liquid, a second liquid, and a third liquid. The second liquid is applied to a position substantially equal to a position to which the first liquid is applied along the width direction. The third liquid is applied to an intermediate position between the position to which the first liquid is applied and the position to which the second liquid is applied along the transport direction, and the intermediate position is different from the position to which the first liquid is applied along the width direction.

Accordingly, even when an error has occurred in positions where the liquid is applied to the material to be coated by the plurality of discharge heads, the application position errors are dispersed, and gap regions in which the liquid is unapplied to the material to be coated are reduced, thereby improving the uniformity of the film to be formed.

Herein, the same positions mean that positions acting as approximately the centers of the liquid applied to the material to be coated are substantially equal to each other. Different positions mean that positions acting as approximately the centers of the liquid applied to the material to be coated are substantially different from each other. The application position error means an error from a desired position to which the ink discharged by the discharge head is applied onto the material to be coated. Further, the different positions mean that if the centers of the liquids are separated from each other, some of the liquids may be superimposed on each other.

Hereinafter, a film forming method and a film forming device according to an embodiment will be described in detail.

Embodiments

Example of Configuration of Film Forming Device 100

First, a configuration of a film forming device 100 according to an embodiment will be described. FIG. 1 is a diagram illustrating an example of a configuration of the film forming device 100. FIG. 1 illustrates the inside of the film forming device 100 viewed from a direction substantially orthogonal to the transport direction 10 of a material 102 to be coated.

As illustrated in FIG. 1, the film forming device 100 includes an unwinder 101, an inkjet head 103, a platen 104, a heat drum 105, a hot air dryer 106, a transport roller 107, a winder 108, and a controller 300. These units or components are disposed sequentially from upstream to downstream along the transport direction 10 of the material 102.

The film forming device 100 uniformly forms a film on the material 102 by applying ink discharged by the inkjet head 103 to the material 102 while transporting the material 102 by the unwinder 101 and the winder 108. Hereinafter, each component will be described in detail.

(Unwinder and Winder)

In the present embodiment, the unwinder 101 is used for unwinding of the material 102, and the winder 108 is used for winding of the material 102. The unwinder 101 rotates the material 102 stored in a roll to supply the material 102 to a transport route of the film forming device 100.

The winder 108 winds up the material 102 to which ink is applied and a film is formed, and stores the material 102 in a roll-like manner.

(Transport Unit)

The platen 104 guides the material 102 to be transported along the transport route. In addition to the transport roller 107, a transport roller or the like is also used as a transport unit. The transport unit, the unwinder, and the winder constitute the transport unit for transporting the material 102.

Although related to other processes, the ink application rate in the film forming device 100 is preferably 30 [m/min] to 100 [m/min], inclusive. Accordingly, the film forming device 100 may be suitably used when high-speed film formation is required.

The material 102 is a continuous substrate along the transport direction 10. The film forming device 100 transports the material 102 along the transport route between the unwinder 101 and the winder 108. The length of the material 102 along the transport direction 10 is at least longer than that of the transport route between the unwinder 101 and the winder 108. The film forming device 100 is capable of continuously forming a film on the material 102 that continues along the transport direction 10.

(Ink)

Ink is an example of a liquid discharged by each of a plurality of inkjet heads. The ink is composed of a liquid that achieves a function of a film. It is sufficient that ink have a viscosity or surface tension that can be discharged from the inkjet heads. Ink is not particularly specified; however, it is preferable that ink have the viscosity of 30 [mPa·s] or less under an ordinary temperature and an ordinary atmospheric pressure, or when the ink is heated or cooled.

More specifically, ink may be a solution containing a solvent such as water or an organic solvent, a dye, a pigment, an electrode material such as an active substance, a functionalizing material such as a polymeric compound, a resin, a surfactant, a biocompatible material such as DNA, an amino acid, a protein and a calcium and an edible material such as a natural dye or the like, a suspension, an emulsion or the like. For example, the above materials may be used in applications such as printing inks, surface treatment liquids, liquids for forming various devices such as components of electronic devices, light emitting devices, and electronic circuit resist patterns.

In addition, in the case where there are many non-volatile components in the ink or in the case where the ink having the metal oxide particles as the main component is used, it is particularly difficult to form a uniform film. Accordingly, the present embodiment provides a particularly large effect.

(Liquid Applicator)

A liquid applicator is a unit for ejecting ink and applying ink onto the material 102. As illustrated in FIG. 1, the film forming device 100 includes an inkjet head 103 as a liquid applicator.

The film forming device 100 includes the inkjet heads 103A, 103B, 103C, and 103D as the inkjet head 103 along the transport direction 10 of the material 102. However, the present invention is not limited to this example, and the film forming device 100 may include two or more inkjet heads along the transport direction 10. It should be noted that inkjet heads 103A, 103B, 103C, and 103D have the same configuration, and inkjet head 103 is a generic notation when inkjet heads 103A, 103B, 103C, and 103D are not specifically distinguished.

The inkjet head 103 has a plurality of nozzle arrays having a plurality of nozzles disposed along a width direction (approximately orthogonal to the transport direction 10) of the material 102. The film forming device 100 includes the inkjet head 103 such that the discharge direction of ink from the nozzles is toward the material 102. The inkjet heads 103A, 103B, 103C, and 103D are examples of a plurality of discharge heads disposed along the transport direction 10 of the material 102 to be transported.

The inkjet head 103 is a line-type inkjet head. The "line-type inkjet head" is an inkjet head having nozzles disposed to discharge ink across an overall width of the material 102 in the width direction. The width of the inkjet head 103 may not necessarily be the overall width of the material 102 in the width direction, and the width of the inkjet head 103 may be determined appropriately.

In industrial applications, as a film is formed at high speed on a large amount of the materials, an inkjet system using a line-type inkjet head as illustrated in FIG. 1 is preferable. Alternatively, in industrial applications, a film is formed continuously for a long time, and when a line-type head is used, some nozzles are not discharged for a long time depending on the form of the film. In such nozzles, drying of the ink in the nozzles or precipitation of the particulate components in the ink may result in non-uniformity of the ink components in the ink, resulting in poor discharge.

Therefore, in the ink application step, it is preferable that the interface of the ink in the nozzles be vibrated, or it is preferable that the ink in the discharge head be constantly circulated in the nozzles that do not discharge ink. By vibrating the interface of the ink in the nozzles or constantly circulating the ink in the discharge head, the ink in an ink flow passage in the inkjet head such as the pressure chamber communicating with the nozzles can be uniformly maintained, and the non-uniformity of the ink in the nozzles can be reduced. Accordingly, it is possible to further prevent abnormal film generation due to the defective discharge. The ink interface in the nozzles is an ink interface in contact with the atmosphere or gases.

In the inkjet head 103, a unit configured to apply an impulse to ink to eject the ink can be appropriately selected depending on the purpose; for example, a pressurizing device, a piezoelectric element, a vibration generating device, an ultrasonic oscillator, a light, or the like can be used as a unit configured to apply an impulse to ink. Specifically, there are piezoelectric actuators such as piezoelectric elements, shape-memory alloy actuators that use metal phase changes due to temperature changes, and electrostatic actuators that use electrostatic forces.

Among these, those configured to apply a voltage to a piezoelectric element which is bonded to a position called a pressure chamber (also referred to as a liquid chamber or the like) in the ink flow passage within the inkjet head 103 is particularly preferable. The inkjet head 103 pressurizes ink in the pressure chamber when the piezoelectric element is deformed by the application of a voltage, by the volume of the pressure chamber being reduced, and discharges ink as droplets from the nozzles.

The inkjet head 103 includes an inkjet ejection unit. An inkjet ejection unit is a collection of functional components and mechanisms associated with ink ejection from the inkjet head 103. The inkjet ejection unit includes at least one of a supply mechanism, a maintenance and restoration mechanism, and a liquid ejection head transfer mechanism in combination with the inkjet head 103, and the like.

(Material to be Coated)

The material 102 to be coated may be a non-permeable substrate, such as a metal sheet, provided with a particle-based layer. The particle-based layer disposed on the non-permeable substrate is, for example, a graphite-based layer or the like.

Non-permeable substrates include metal sheets such as aluminum, aluminum oxide, copper, stainless steel, nickel, platinum, and the like, resin films such as polypropylene films, polyethylene terephthalate films, and nylon films, and the like.

(Drying Unit)

A drying unit is a unit configured to dry ink on the material 102 after the ink has been ejected onto the material 102. In FIG. 1, a heat drum 105 and a hot air dryer 106 are configured to form a drying unit 200.

The heat drum 105 is a rotatable drum. The heat drum 105 is an example of a temperature regulator that contacts an outer peripheral surface of the material 102 to which ink is applied and transported to heat or cool the material 102.

A temperature control method using the heat drum 105 is a method for heating or cooling the material 102 using a liquid or gas filled inside the heat drum 105 as a heat exchange medium, a method for providing a heat source device inside the heat drum 105, or the like. The drying unit 200 uses a liquid or a gas filled inside the heat drum 105 as a heat exchange medium, and circulates the heat exchange medium between the heat drum 105 and an external device, such as a chiller, to maintain the heat exchange medium at a predetermined temperature. The drying unit 200 adjusts the material 102 to a predetermined temperature by heat exchange with the heat exchange medium.

The fluid flowing into the heat drum 105 is not particularly restricted insofar as the fluid has fluidity, such as water or oil, but water may be preferable in terms of easiness of handling. The use of heated air as a gas flowing into the heat drum 105 is desirable in terms of cost and safety.

The drying unit 200 applies suction to liquid or gas circulating with an external device, such as a chiller, into the heat drum 10 and discharges the liquid or gas out of the heat drum 105 via valves disposed at both ends of the heat drum 105 (ends in the direction orthogonal to the transport direction 10).

Examples of a heat source device disposed inside the heat drum 105 include a halogen heater, an infrared heater, a nichrome heater, and the like.

The hot air dryer 106 includes nozzles with openings facing the outer peripheral surface of the heat drum 105 and extending in a width direction. The hot air dryer 106 blows hot air from the nozzles to the material 102 wound around the heat drum 105 to heat the material 102 and dries the ink on the material 102. Alternatively, or in addition to the hot air dryer 106, an infrared heater may be further provided so as to irradiate the surface of the material 102 with infrared rays to dry the ink on the material 102.

When the temperature of the heat drum 105, the temperature of the hot air blown by the hot air dryer 106, and the wind speed of the hot air blown by the hot air dryer 106 are set to appropriate ranges according to the drying performance of the solvent used for the ink and the adverse effect of damage to the material to be coated used, the power consumption necessary for the drying is reduced.

(Controller)

The controller 400 controls the operation of the film forming device 100. The controller 400 may be installed at any location inside or outside the film forming device 100.

Example of Configuration of the Inkjet Head 103

Figure 2:
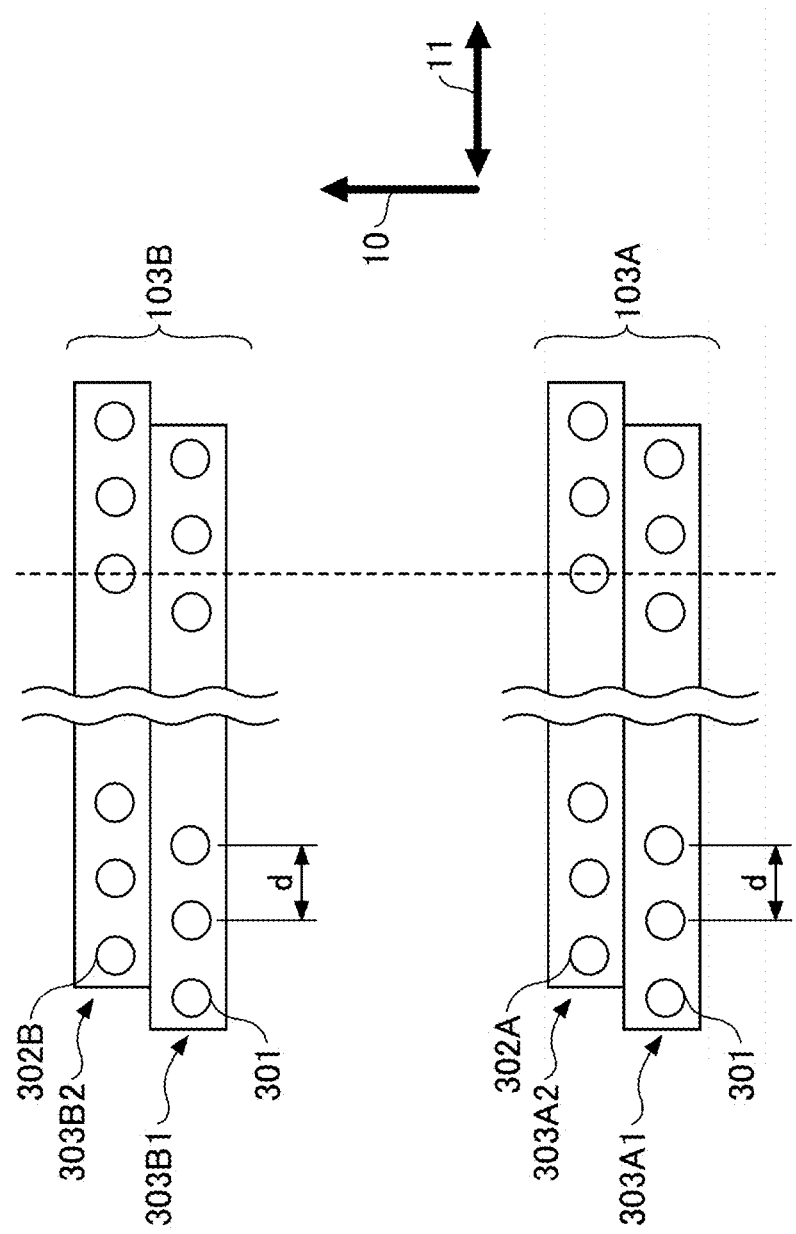
FIG. 2 is a diagram illustrating an example of a configuration of an inkjet head according to an embodiment.

Referring now to FIG. 2, a configuration of the inkjet head 103 will now be described. FIG. 2 is a diagram illustrating an example of a configuration of the inkjet head 103. FIG. 2 is an enlarged schematic view illustrating inkjet heads 103A and 103B disposed along the transport direction 10 viewed from the ink discharge direction side.

As illustrated in FIG. 2, an inkjet head 103A has a nozzle plate 302A formed with a plurality of nozzles 301 arranged at a substantially constant nozzle spacing d along the width direction 11. The plurality of nozzles 301 forms two nozzle arrays 303A1 and 303A2. The inkjet head 103A shifts the nozzle array 303A1 and the nozzle array 303A2 along the width direction 11 by a distance of approximately half the nozzle spacing d.

Similarly, an inkjet head 103B has a nozzle plate 302B formed with a plurality of nozzles 301 arranged at substantially constant spacing d along the width direction 11. The plurality of nozzles 301 forms two nozzle arrays 303B1 and 303B2. The inkjet head 103B shifts the nozzle array 303B1 and nozzle array 303B2 along width direction 11 by a distance of approximately half the nozzle spacing d.

The film forming device 100 includes the nozzle array 303A1 and the nozzle array 303B1 disposed at positions substantially equal to each other in the width direction 11, and also includes the nozzle array 303A2 and the nozzle array 303B2 disposed at positions substantially equal to each other in the width direction 11.

FIG. 2 illustrates a configuration in which the inkjet heads 103A and 103B each include two rows of nozzles, but the number of nozzle rows in each inkjet head is not limited to two. The inkjet heads 103A and 103B may each include one or more rows of nozzles. In FIG. 2, only configurations of the inkjet heads 103A and 103B among the inkjet heads 103 are illustrated as examples, but the same configurations may apply to the inkjet heads 103C and 103D.

Example of Functional Configuration of the Controller 400

Figure 3:
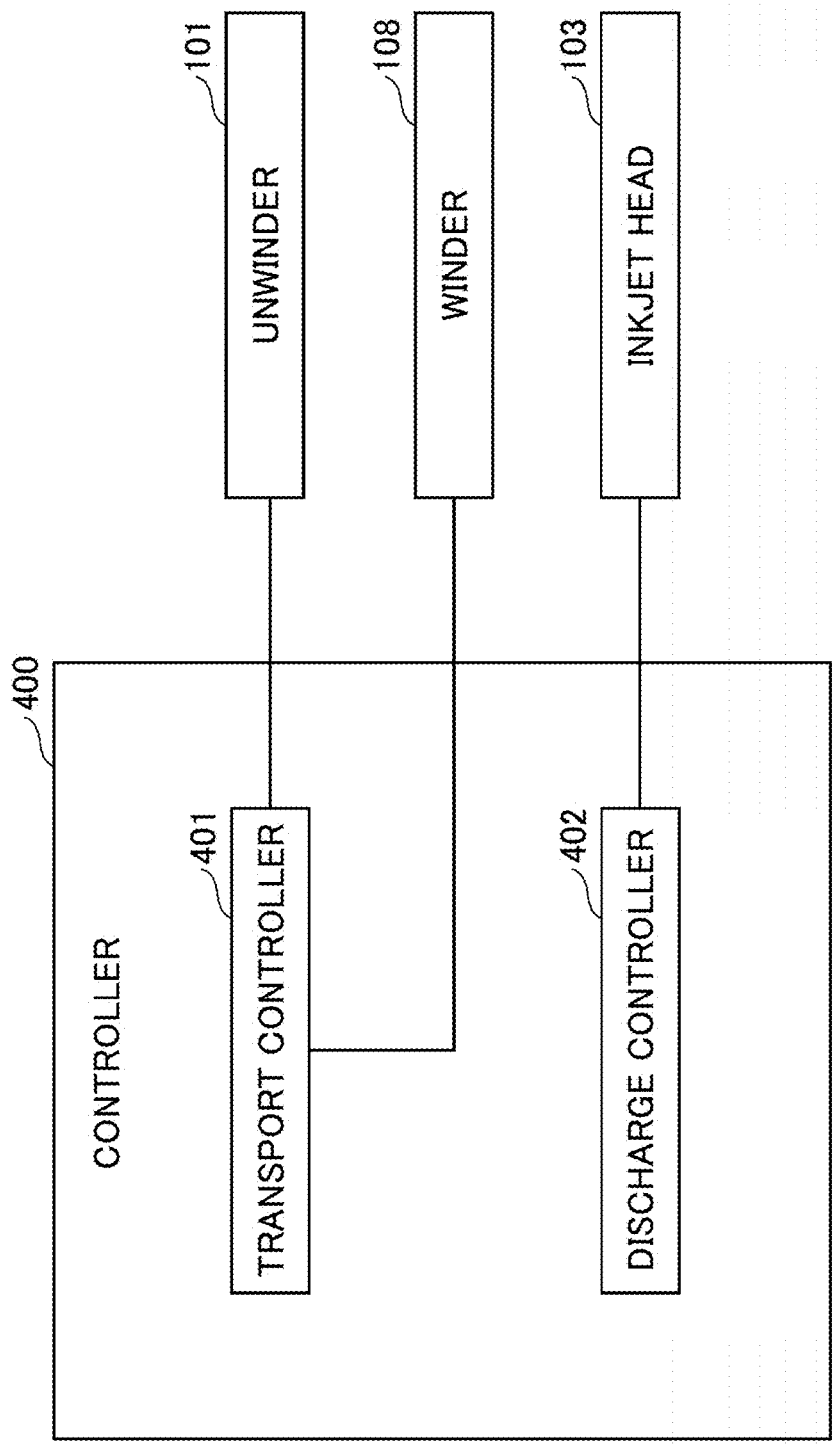
FIG. 3 is a block diagram illustrating an example of a functional configuration of a controller according to an embodiment.

Next, a functional configuration of the controller 400 will be described with reference to FIG. 3. FIG. 3 is a block diagram illustrating an example of a functional configuration of a controller 400.

As illustrated in FIG. 3, the controller 400 includes a transport controller 401 and a discharge controller 402. These functions may be implemented in electrical circuits, or some of these functions may be implemented in software. These functions may also be implemented by multiple circuits or multiple software.

The transport controller 401 controls the start and the stop of the transport of the material 102, or the transport speed by the unwinder 101 and the winder 108. The discharge controller 402 controls the discharge timing of ink by the inkjet head 103.

Example of Operation of the Film Forming Device 100

Next, an operation of the film forming device 100 will be described. In forming a film by the film forming device 100, the inkjet heads 103A, 103B, 103C, and 103D disposed in the transport direction 10 sequentially discharge ink of the same type and apply the ink on the material 102.

Figure 4:
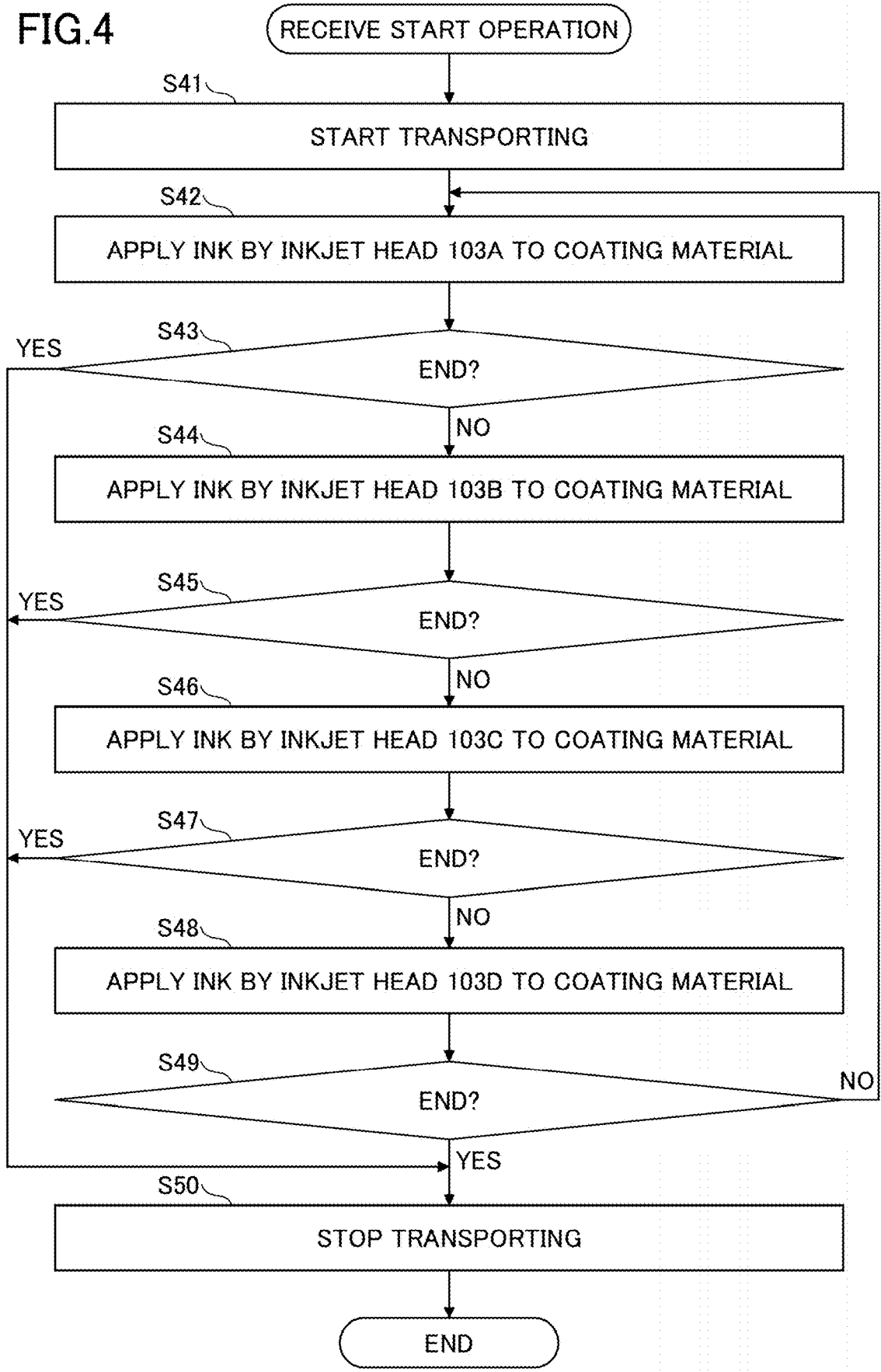
FIG. 4 is a flowchart illustrating an example of an operation of a film forming device according to an embodiment.

FIG. 4 is a flowchart illustrating an example of an operation performed by the film forming device 100. FIG. 4 illustrates an operation starting from a point when a user performs an operation on an operating unit of the film forming device 100 to start forming of a film and the operation performed by the user is received by the film forming device 100.

First, in step S41, the film forming device 100 starts unwinding of the material 102 by the unwinder 101 and starts winding of the material 102 by the winder 108, thereby starting the transporting of the material 102.

Subsequently, in step S42, the inkjet head 103A discharges ink in parallel from all the nozzles toward the material 102 to be transported and stops discharging ink by all the nozzles after the material 102 has been transported by a predetermined distance. As a result, the inkjet head 103A applies ink to a region on the material 102, which corresponds to a predetermined distance in the transport direction 10 and an overall width in the width direction.

Subsequently, in step S43, the film forming device 100 determines whether to end the film formation. The film forming device 100 determines whether to end the film formation by determining whether a predetermined ending condition is satisfied or whether the film forming device 100 has received an operation to end the film formation from a user through the operating unit. The same applies to the following determination to end the film formation.

When the film forming device 100 determines in step S43 that the film formation ends (step S43, Yes), the operation proceeds to step S50. Meanwhile, when the film forming device 100 determines that the film formation does not end (No in step S43), the operation proceeds to step S44.

Subsequently, in step S44, the inkjet head 103B discharges ink in parallel from all the nozzles toward the material 102 to be transported, and stops discharging of ink by all the nozzles after the material 102 has been transported a predetermined distance. As a result, the inkjet head 103B applies ink to a region on the material 102, which corresponds to a predetermined distance in the transport direction 10 and an overall width in the width direction, on the downstream side along the transport direction 10 of the region where the inkjet head 103A applies ink.

The inkjet head 103B applies ink to the material 102 intermittently rather than continuously because the inkjet head 103B applies ink to a position different from the position to which the ink is applied by the inkjet head 103A in the transport direction 10. The inkjet head 103B applies ink without gaps with respect to the region where ink is applied by the inkjet head 103A.

The inkjet head 103B also applies ink to the material 102 such that the area of the region where the ink is applied by the inkjet head 103B is substantially equal to the area of the region where the ink is applied by the inkjet head 103A.

Subsequently, in step S45, the film forming device 100 determines whether to end the film formation.

When the film forming device 100 determines in step S45 that film formation ends (Yes in step S45), the operation proceeds to step S50. Meanwhile, when the film forming device 100 determines that the film formation does not end (No in step S45), the operation proceeds to step S46.

Subsequently, in step S46, the inkjet head 103C discharges ink in parallel from all the nozzles toward the material 102 to be transported and stops discharging ink by all the nozzles after the material 102 has been transported by a predetermined distance. As a result, the inkjet head 103C applies ink to a region on the material 102, which corresponds to a predetermined distance in the transport direction 10 and an overall width in the width direction, on the downstream side along the transport direction 10 of the region where ink is applied by the inkjet head 103B.

The inkjet head 103C applies ink to the material 102 intermittently rather than continuously because the inkjet head 103C applies ink to a position different from the position to which the ink is applied by the inkjet head 103B along the transport direction 10. The inkjet head 103C applies ink without gaps with respect to the region where ink is applied by the inkjet head 103B.

The inkjet head 103C also applies ink to the material 102 such that the area of the region where the ink is applied by the inkjet head 103C is substantially equal to the area of the region where the ink is applied by the inkjet head 103B.

Subsequently, in step S47, the film forming device 100 determines whether to end the film formation.

When the film forming device 100 determines in step S47 that film formation ends (steps S47 and Yes), the operation proceeds to step S50. Meanwhile, when the film forming device 100 determines that the film formation does not end (No in step S47), the operation proceeds to step S48.

Subsequently, in step S48, the inkjet head 103D discharges ink in parallel from all the nozzles toward the material 102 to be transported and stops discharging ink by all the nozzles after the material 102 has been transported by a predetermined distance. Thus, the inkjet head 103D applies ink to a region on the material 102, which corresponds to a predetermined distance in the transport direction 10 and an overall width in the width direction, on the downstream side along the transport direction 10 of the region where the inkjet head 103C has applied ink.

The inkjet head 103D applies ink to the material 102 intermittently rather than continuously because the inkjet head 103D applies ink to a position different from the position to which the ink is applied by the inkjet head 103C along the transport direction 10. The inkjet head 103D applies ink without gaps with respect to the region where ink is applied by the inkjet head 103C.

The inkjet head 103D also applies ink to the material 102 such that the area of the region where the ink is applied by the inkjet head 103D is substantially equal to the area of the region where the ink is applied by the inkjet head 103C.

Subsequently, in step S49, the film forming device 100 determines whether to end the film formation.

When the film forming device 100 determines in step S49 that the film formation ends (step S49, Yes), the operation proceeds to step S50. Meanwhile, when the film forming device 100 determines that the film formation does not end (No in step S49), the operation returns to step S42, and the operation from step S42 onward is performed again.

Subsequently, in step S50, the film forming device 100 stops the unwinding of the material 102 by the unwinder 101 and stops the winding of the material 102 by the winder 108, thereby stopping the transporting of the material 102.

In this manner, the film forming device 100 can apply ink to the material 102.

First Embodiment

Figure 5:
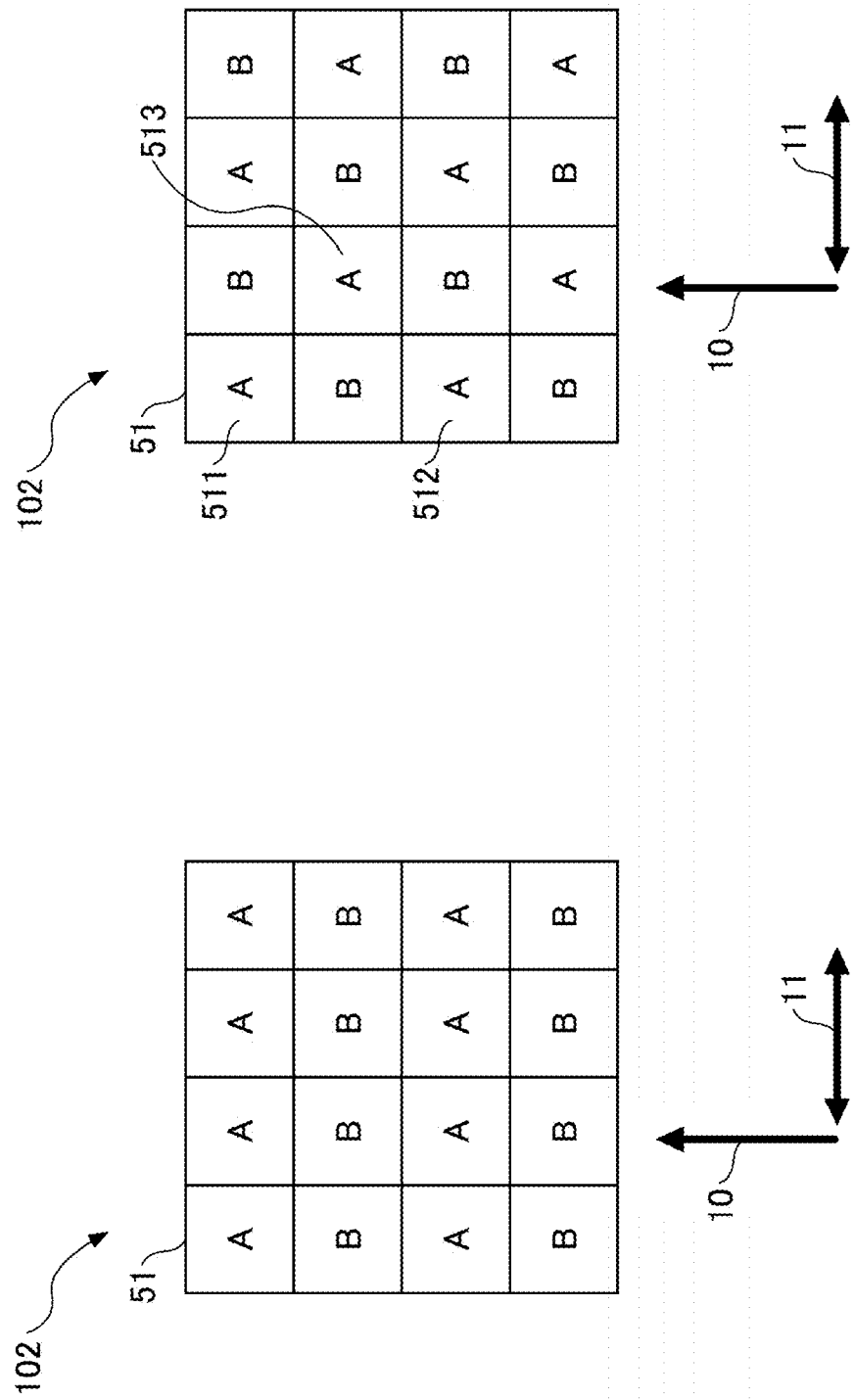
FIG. 5A and FIG. 5B are diagrams illustrating examples of an ink application by a film forming method according to a first embodiment.

Example of Application of Ink by the Film Forming Method According to First Embodiment Next, an application of ink to the material 102 by the film forming method according to the first embodiment will be described with reference to FIGS. 5A and 5B. FIGS. 5A and 5B are diagrams illustrating examples of the ink application according to the present embodiment, where FIG. 5A is a diagram illustrating a comparative example, and FIG. 5B is a diagram illustrating the present embodiment. The comparative example is an example in which the present embodiment is not applied.

FIGS. 5A and 5B also illustrate positions to which ink ejected by the inkjet head 103A and the inkjet head 103B from among the inkjet heads 103 is applied to the material 102. Each square illustrated in FIGS. 5A and 5B represents one pixel 51 on which one drop of ink is applied to the material 102. A plurality of pixels 51 are disposed along the transport direction 10 and also along the width direction 11 to form a matrix in which the transport direction 10 is along columns and the width direction 11 is along rows. The pixels 51 are generic representations of a plurality of pixels. Although a square shape is illustrated as one pixel 51, the shape of the pixel 51 is not limited to the square shape, and may be any shape.

The "A" illustrated in the pixel 51 indicates a pixel to which ink is applied by the inkjet head 103A, and the "B" illustrated in the pixel 51 indicates a pixel to which ink is applied by the inkjet head 103B. The same will apply hereafter.

As illustrated in FIG. 5A, in a comparative example, the inkjet head 103A applies ink in the first row, the inkjet head 103B applies ink in the second row, the inkjet head 103A applies ink in the third row, and the inkjet head 103B applies ink in the fourth row, in the order from the downstream side (the upper side in the figure) along the transport direction 10. The inkjet heads that apply ink are different on a per row basis. The same applies to the inkjet heads 103C and 103D.

Meanwhile, as illustrated in FIG. 5B, in the first embodiment, each of the inkjet heads 103A and 103B applies ink in a staggered manner.

The application of ink in a staggered manner is described in more detail. The inkjet head 103A applies first ink 511, second ink 512, and third ink 513, as illustrated in FIG. 5B. In FIG. 5B, the first ink 511, the second ink 512, and the third ink 513 represent inks applied to the pixels 51, respectively.

The second ink 512 is applied to a position substantially equal to that of the first ink 511 along the width direction 11. That is, coordinates of the pixel to which the second ink 512 is applied and coordinates of the pixel to which the first ink 511 is applied are substantially the same along the width direction 11.

The third ink 513 is applied to an intermediate position between a position to which the first ink 511 is applied and a position to which the second ink 512 is applied along the transport direction 10, and this intermediate position is a position different from the position to which the first ink 511 is applied along the width direction 11. That is, the coordinate in the transport direction 10 of a pixel to which the third ink 513 is applied is substantially equal to the coordinate in the transport direction 10 of a pixel at the intermediate position between the position to which the first ink 511 is applied and the position to which the second ink 512 is applied. Then, the coordinate in the width direction 11 of the pixel to which the third ink 513 is applied and the coordinate in the width direction 11 of the pixel to which the first ink 511 is applied are different.

"Applying ink in a staggered manner" refers to applying the first ink 511, the second ink 512 and the third ink 513 as described above. Herein, the first ink 511 is an example of a first liquid, the second ink 512 is an example of a second liquid, and the third ink 513 is an example of a third liquid.

Of the inks applied by the inkjet head 103A, only the first ink 511, the second ink 512, and the third ink 513 have been described. However, the inkjet head 103A similarly applies inks other than the first ink 511, the second ink 512, and the third ink 513 to the material 102 in a staggered manner.

The inkjet head 103B similarly applies inks to the material 102 in a staggered manner. Note that, as illustrated in FIG. 5B, the inkjet head 103B applies ink to the pixels 51 so as not to be superimposed on the pixels to which ink is applied by the inkjet head 103A. Similarly, the inkjet heads 103C and 103D apply ink to the material 102 in a staggered manner such that ink applied to the pixels 51 is not superimposed on the pixels to which ink is applied by the other inkjet heads.

Although an example is illustrated in which the pixels to which the first ink 511 is applied and the pixels to which the third ink is applied are adjacent along the width direction 11, one or more pixels may be included between both the pixels along the width direction 11.

FIG. 5B illustrates an example in which one pixel is interposed between a pixel to which the first ink 511 is applied and a pixel to which the second ink 512 is applied, along the transport direction 10. However, the number of pixels to be interposed between the two pixels is not limited to one, and two or more pixels may be interposed between the two pixels.

Herein, when an odd number of pixels is interposed between the pixel to which the first ink 511 is applied and the pixel to which the second ink 512 is applied, along the transport direction 10, the third ink 513 is applied to the pixels that are interposed between the two pixels. In the example of FIG. 5B, an odd number of pixels that is one pixel is interposed between the pixel to which the first ink 511 is applied and to the pixel to which the second ink 512 is applied, along the transport direction 10, and the third ink 513 is applied to the interposed one pixel.

However, in the case where an even number of pixels is interposed between the pixel to which the first ink 511 is applied and the pixel to which the second ink 512 is applied, along the transport direction 10, there is no pixel centered at an intermediate position of the two pixels. In this case, the third ink 513 is applied to the pixel having the center at a position shifted upstream or downstream by 0.5 pixels with respect to the intermediate position of the two pixels along the transport direction 10.

Figure 6:
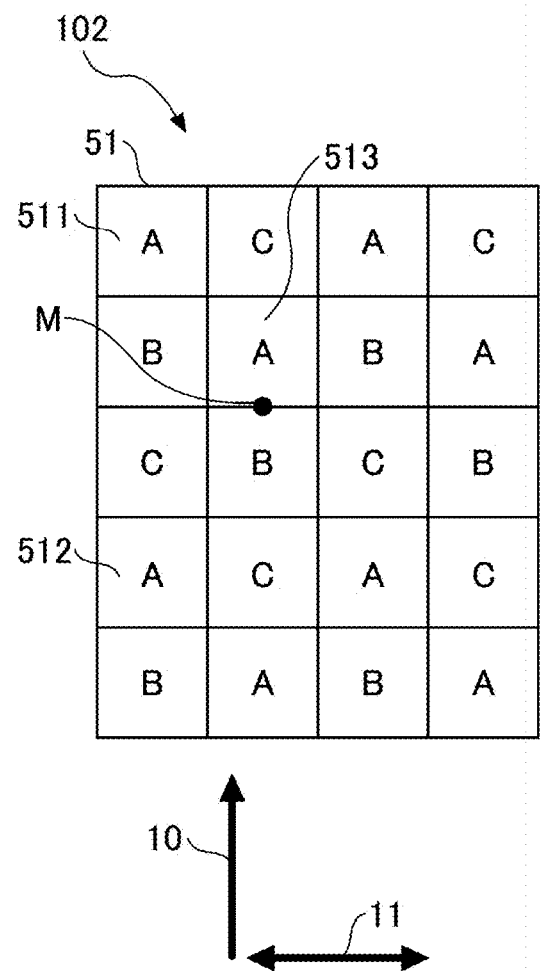
FIG. 6 is a diagram illustrating an example including an even number of pixels between the first ink and the second ink.

FIG. 6 is a diagram illustrating the case where an even number of pixels is interposed between the pixel to which the first ink 511 is applied and the pixel to which the second ink 512 is applied, along the transport direction 10. In the example of FIG. 6, an even number of pixel that is two pixels are interposed between the pixel to which the first ink 511 is applied and the pixel to which the second ink 512 is applied. The third ink 513 is applied to the pixel having the center at a position shifted downstream by 0.5 pixels with respect to an intermediate position M between the two pixels along the transport direction 10.

In other words, the third ink 513 applied to the intermediate position between the position to which the first ink 511 is applied and the position to which the second ink 512 is applied along the transport direction 10 includes ink applied to the pixel having the center at a position shifted upstream or downstream by 0.5 pixels with respect to the intermediate position M between the two pixels along the transport direction 10.

Actions of Film Forming Method According to the First Embodiment

Next, actions of the film forming method according to the present embodiment will be described with reference to FIGS. 7A to 7D. FIGS. 7A to 7D are diagrams illustrating actions according to the first embodiment. FIG. 7A is a diagram illustrating a case where ink is applied to the material 102 according to a comparative example, and FIG. 7B is a diagram illustrating a case where an error in the application position has occurred in FIG. 7A. FIGS. 7A and 7B correspond to ink applied at the position illustrated in FIG. 5A.

FIG. 7B illustrates the case where the application position error has occurred along the transport direction 10. Since the inkjet heads 103A, 103B, 103C, and 103D are spaced apart along the transport direction 10, application position errors along the transport direction 10 are likely to occur.

FIG. 7C is a diagram illustrating an example of ink applied to the material 102 according to the first embodiment, and FIG. 7D is a diagram illustrating a case in which an error in the application position has occurred in FIG. 7C. FIGS. 7C and 7D correspond to ink applied at the position illustrated in FIG. 5B.

In FIGS. 7A to 7D, dots 61 illustrated in dot hatching illustrate ink applied by inkjet head 103A to the material 102. Dots 62 illustrated in diagonal hatching illustrate ink applied by the inkjet head 103B to the material 102.

When ideal ink application without an application position error is performed, the state of the ink applied to the material 102 does not differ between the comparative example illustrated in FIG. 7A and the first embodiment illustrated in FIG. 7C, and the film formed on the material 102 does not differ between the comparative example and the first embodiment.

However, if an application position error has occurred in the comparative example, a gap region 63 where ink is not applied extends in a wavy streak-like manner along the width direction 11, as illustrated in FIG. 7B.

In contrast, in the first embodiment, as illustrated in FIG. 7D, the area of a gap region 64 is smaller than the area of the gap region 63. Since the ink is applied in a staggered manner on the material 102, the application position errors are dispersed and the gap region is reduced. The reduction in the area of the gap region 64 results in a uniform thickness of the film formed on the material 102.

For example, it is assumed that the dot spacing along each of the transport direction 10 and the width direction 11 corresponds to a resolution of 1200 [dpi; dot per inch], and the diameter of the dot is 30 [μm]. If the ink applied by the inkjet head 103B is shifted by 15 [μm] relative to the ink applied by the inkjet head 103A along the transport direction 10, the coverage of the ink on the material 102 is approximately 78[%] in a comparative example. In contrast, in the first embodiment, the coverage of the ink on the material 102 is approximately 97[%]. As described above, in the first embodiment, even when the application position error has occurred, the coverage ratio can be maintained at a high level compared to the comparative example, and the area of the gap region can be reduced.

Advantageous Effects of Film Forming Method According to the First Embodiment

Next, advantageous effects of the film forming method according to the second embodiment will be described.

As described above, according to the first embodiment, the ink (liquid) is discharged to the material 102 from each of the inkjet heads 103A, 103B, 103C, and 103D (a plurality of discharge heads) disposed along the transport direction 10 of the material 102 to be transported.

Each of the inkjet heads 103A, 103B, 103C, and 103D has a plurality of nozzles 301 disposed along the width direction 11 to discharge ink. In the application step, each of the inkjet heads 103A, 103B, 103C, and 103D applies the first ink 511 (first liquid), the second ink 512 (second liquid), and the third ink 513 (third liquid).

The second ink 512 is then applied to a position substantially equal to the position to which the first ink 511 is applied along the width direction 11. The third ink 513 is applied to a position between the position to which the first ink 511 is applied and the position to which the second ink 512 is applied along the transport direction 10. That is, the third ink 513 is applied to a position different from the position to which the first ink 511 is applied along the width direction 11.

Accordingly, even when an error has occurred in the positions where the liquid is applied to the material due to the inkjet heads 103A, 103B, 103C, and 103D, the application position errors are dispersed and the area of the gap region is reduced. The uniformity of the film to be formed can thus be improved.

For example, when a defect of a film formed on the material 102 is detected and the detected defect is restored, the restoration time can be reduced, the amount of ink used for restoration can be reduced, and the film can thus be formed at a low cost.

Second Embodiment

Next, a film forming method according to a second embodiment will be described. The film forming device 100 can be applied to the film forming method according to the second embodiment and each of the following embodiments. In addition, the same numbers are assigned to the same components or units as those described in the above-described first embodiment, and duplicated descriptions are appropriately omitted. The same applies to each of the embodiments illustrated below.

According to the second embodiment, liquids discharged by two or more discharge heads from among the plurality of discharge heads are applied to the same region on the material to be coated in a superimposed manner, thereby increasing the amount of liquid applied within a predetermined region on the material to be coated and allowing a thick film to be formed.

Figure 8:
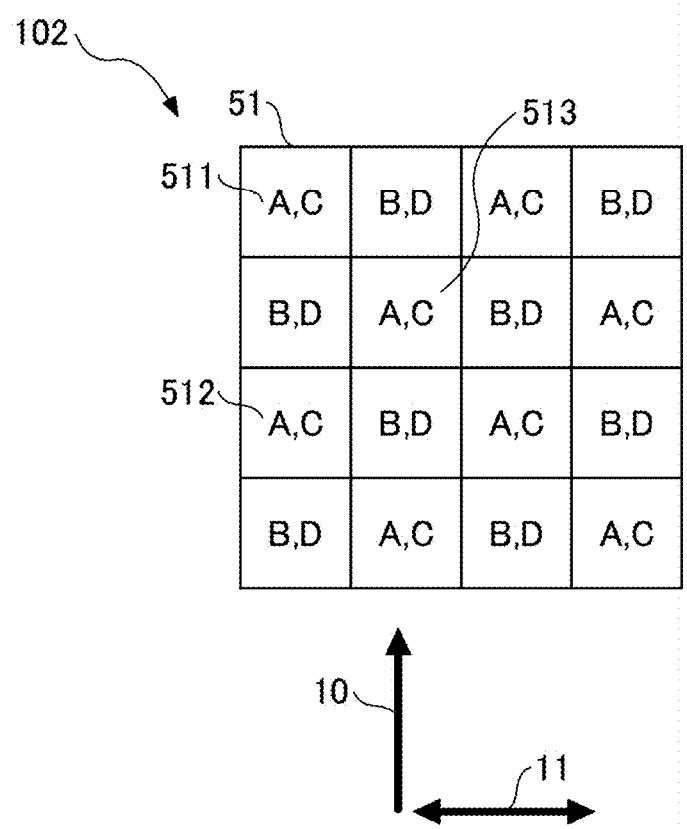
FIG. 8 is a diagram illustrating an example of an ink application by a film forming method according to a second embodiment.

FIG. 8 is a diagram illustrating an example of the ink application by a film forming method according to the second embodiment. FIG. 8 illustrates four of the inkjet heads 103A, 103B, 103C, and 103D, where the inkjet heads 103A and 103C apply ink to the same pixel 51 on the material 102 and the inkjet heads 103B and 103D apply ink to the same pixel 51 on the material 102.

The "C" illustrated in the pixel 51 indicates a pixel to which ink is applied by the inkjet head 103C, and the "D" illustrated in the pixel 51 indicates a pixel to which ink is applied by the inkjet head 103D. The same applies hereafter.

The ink discharged by each of the four inkjet heads 103A, 103B, 103C, and 103D is applied onto the material 102 in a staggered manner.

In the second embodiment, ink discharged by the inkjet heads 103A and 103C from among the four inkjet heads 103A, 103B, 103C, and 103D is applied in a superimposed manner in the same region of the material 102.

Thus, compared to the case where ink discharged from each of the four inkjet heads 103A, 103B, 103C, and 103D is applied onto the material 102 without being superimposed onto each other, the amount of the ink applied on the material 102 can be increased to form a thick film. For example, in the application in which an insulating layer having a high insulating property is formed on an electrode, it is possible to secure a high insulating property by increasing the amount of ink applied to form a thick film. This indicates that the second embodiment is particularly preferable.

The effects other than those described above are the same as those described in the first embodiment.

Third Embodiment

Next, a film forming method according to a third embodiment will be described.

In the third embodiment, the plurality of discharge heads includes four or more discharge heads including a first discharge head and a second discharge head adjacent to the first discharge head along the transport direction, and the liquid discharged by the first discharge head is applied to a position different from a position to which the liquid discharged by the second discharge head is applied along the transport direction. This makes the film to be formed uniform.

FIGS. 9A and 9B are diagrams each illustrating an example of the ink application by a film forming method according to the second embodiment. FIG. 9A illustrates a comparative example, and FIG. 9B illustrates the third embodiment. The comparative example is an example of ink application to which none of the first to third embodiments is applied.

In FIGS. 9A and 9B, the pixels illustrated in the dot hatching illustrate the pixels to which the ink discharged by any one of the inkjet heads 103A and 103B is applied.

As illustrated in FIG. 9A, in the comparative example, the inkjet heads 103A and 103B apply ink to the same row, and inkjet heads 103C and 103D apply ink to the same row. The row in which ink is applied by the inkjet heads 103A and 103B is different from the row in which ink is applied by the inkjet heads 103C and 103D.

In contrast, as illustrated in FIG. 9B, in the third embodiment, the inkjet head 103A and the inkjet head 103B apply ink to different rows. Likewise, the inkjet head 103C and inkjet head 103D apply ink to different rows.

In other words, the inkjet head 103 has four or more discharge heads including the inkjet head 103A and the inkjet head 103B adjacent to the inkjet head 103A along the transport direction 10. The ink discharged by the inkjet head 103A is applied to a position different from a position to which the ink discharged by the inkjet head 103B is applied along the transport direction 10.

Further, the first ink 511, the second ink 512, and the third ink 513 are applied to the material 102 in a staggered manner.

Herein, a distance from the inkjet head 103B to the inkjet head 103A is shorter than the distance from the inkjet head 103C or 103D to the inkjet head 103A. Thus, the application position error of the inkjet head 103B with respect to the inkjet head 103A is likely to be smaller than the application position error of the inkjet head 103C or 103D with respect to the inkjet head 103A.

For example, when the entire film forming device 100 is thermally expanded, the positions of the inkjet heads 103B, 103C, and 103D relative to the inkjet head 103A are also shifted with the expansion. In this case, since the shifted amount is proportional to the distance between the inkjet heads, the shifted amount of the inkjet head 103B is smaller than the shifted amounts of the inkjet heads 103C and 103D.

This shifted amount is the application position error. Thus, when the inkjet head 103A and the inkjet head 103B apply ink to different positions along the transport direction 10, the application position errors can be reduced, and the application position errors in the entire inkjet heads 103A, 103B, 103C, and 103D can be reduced. This enables the uniformity of the film to be formed.

The aforementioned actions and effects are also obtained between the inkjet head 103C and the inkjet head 103D adjacent to the inkjet head 103C disposed along the transport direction 10. The actions and effects other than those mentioned above are the same as those described in the first embodiment.

Fourth Embodiment

Next, a film forming method according to a fourth embodiment will be described.

In the fourth embodiment, a plurality of discharge heads includes N discharge heads, and liquids discharged by adjacent M discharge heads (i.e., two or more neighboring discharge heads) disposed along the transport direction from among the N discharge heads are applied to at least one pixel from among all the pixels disposed along the width direction, where N represents an integer and M represents an integer equal to or greater than N/2 and less than N/2+1.

The film forming device 100 can also be applied to the fourth embodiment. Herein, an example will be described in which the film forming device 100 includes five inkjet heads 103A, 103B, 103C, 103D, and 103E disposed along the transport direction 10.

FIG. 10 is a diagram illustrating an example of ink application by a film forming method according to the fourth embodiment. The "E" illustrated in the pixels 51 indicates a pixel to which ink is applied by the inkjet head 103E. In FIG. 10, the pixels 51 to which ink is applied by the inkjet heads 103A, 103B and 103C are illustrated with dot hatching.

Herein, the inkjet heads 103A, 103B, 103C, 103D, and 103E are examples of N discharge heads. Thus, N=5. The inkjet heads 103A, 103B, and 103C are examples of the adjacent M discharge heads among the N discharge heads disposed along the transport direction. Thus, M=3.

As illustrated in FIG. 10, the inkjet heads 103A, 103B, and 103C each apply ink to at least one pixel from among all the pixels disposed along the width direction 11.

In the example illustrated in FIG. 10, the number of pixels of all the pixels disposed along the width direction 11 is four. In the first row from the downstream side (upper side in the figure) along the transport direction 10, the inkjet head 103A applies ink to two pixels, and in the second row, the inkjet head 103B applies ink to two pixels. In the third row, the inkjet heads 103A and 103C apply ink to four pixels. Thus, in any one of the first to third rows, each of the inkjet heads 103A, 103B and 103C applies ink to at least one pixel.

In this manner, the adjacent inkjet heads along transport direction 10 can apply ink to different positions along transport direction 10. Thus, similar to that described in the third embodiment, the application position error as an overall result of the inkjet heads 103A, 103B, 103C, 103D, and 103E can be reduced, and the film to be formed can be made uniform. The other effects are the same as those of the first embodiment.

In the fourth embodiment, the case where N=5 and M=3 is illustrated; however, the fourth embodiment is not limited to this exemplified range, and may be appropriately changed within the range, where N is an integer and M is an integer equal to or greater than N/2 and less than N/2+1.

Fifth Embodiment

Next, a film forming method according to a fifth embodiment will be described.

When some of the pixels to which ink is to be applied are non-applied pixels, the amount of ink applied to the material 102 is reduced, and a thin film can be formed. Herein, the term "non-applied" means "ink being unapplied".

However, when non-applied pixels are locally concentrated, the thickness of concentrated portions of the film may be reduced, resulting in a decrease in the uniformity of the film.

Thus, in the fifth embodiment, each of the plurality of discharge heads is capable of applying a liquid to the plurality of pixels, at least one liquid from among the first to the third liquids is unapplied in the application step, and pixels corresponding to the unapplied liquid are separated from each other by one or more pixels.

Figure 11:
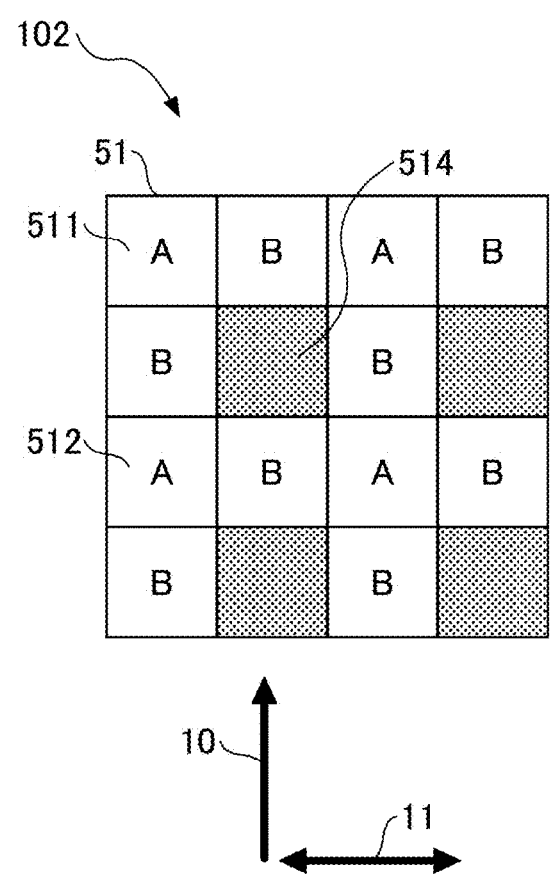
FIG. 11 is a diagram illustrating an example of an application by a film forming method according to the fifth embodiment.

FIG. 11 is a diagram illustrating an example of the ink application by a film forming method according to the fifth embodiment. The first ink 511 corresponds to the first liquid and the second ink 512 corresponds to the second liquid. Non-applied pixels 514 are pixels to which the third ink corresponding to the third liquid would otherwise be applied; however, since the third ink is unapplied to these pixels, the pixels become the non-applied pixels to which the ink is unapplied. The non-applied pixels 514 are a generic representation of a plurality of non-applied pixels. In FIG. 11, the non-applied pixels 514 are illustrated by dot hatching.

As illustrated in FIG. 11, four non-applied pixels 514 are separated from each other by one pixel. In this manner, the four non-applied pixels 514 are dispersed to prevent localized concentration of the non-applied pixels. As a result, it is possible to prevent the uniformity of the film from decreasing. In addition, when an insulating layer formed on the electrode is an example of a film, the risk of short circuit is reduced by increasing the uniformity of the film.

Note that in the example illustrated in FIG. 11, one pixel is interposed between the non-applied pixels 514. However, the present invention is not limited to this example, and one or more pixels may be interposed between the non-applied pixels 514. For example, if the number of non-applied pixels 514 is small, further more pixels may be interposed between the non-applied pixels 514. The effects other than those described above are the same as those illustrated in the first embodiment.

While the embodiments have been described above, the present invention is not limited to the above specifically disclosed embodiments, and various modifications and alterations are possible without departing from the scope of the claims.

In the embodiments described above, a configuration of uniformly forming a film on the material to be coated is illustrated, but ink ejected by an inkjet head may form a predetermined pattern on the material to be coated. The predetermined pattern may, for example, be an identification code, such as a bar code or a two-dimensional code, indicating information on an electrode or the like, which is manufactured by applying ink to the material to be coated. Accordingly, it is possible to efficiently provide information on the material to be coated to be formed or the electrodes to be manufactured without performing a separate step.

In addition, numerical numbers such as the ordinal numbers, quantities, and the like used in the description of the embodiments are all exemplified for the purpose of illustrating the art of the invention, and the invention is not limited to these exemplary numbers. The connection relationship between the components is exemplified for the purpose of illustrating the technology of the present invention, and the connection relationship that achieves the function of the present invention is not limited to the exemplified connection relationship.

In addition, each of the functions of the embodiments described above may be implemented by one or more processing circuits. As used herein, a "processing circuit" includes a processor programmed to perform each function by software, such as a processor implemented in each of electronic circuits, or a device designed to perform each function as described above such as an ASIC (Application Specific Integrated Circuit), a digital signal processor (DSP), a field programmable gate array (FPGA), or a conventional circuit module.

Advantageous Effects of the Invention

According to the present invention, the uniformity of a film to be formed can be improved.

What is claimed is:

1. A film forming method for forming a film formed on a material to be coated, the film forming method comprising:
applying liquids to the material by discharging the liquids from each of a plurality of discharge heads, the plurality of discharge heads being disposed along a transport direction of the material to be transported,
wherein each of the plurality of discharge heads has a plurality of liquid discharge nozzles disposed along a direction intersecting the transport direction,
wherein the applying includes applying of at least a first liquid, a second liquid, and a third liquid from each of the plurality of discharge heads,
wherein the second liquid is applied to a position substantially equal to a position to which the first liquid is applied along a width direction,
wherein the third liquid is applied to an intermediate position between the position to which the first liquid is applied and the position to which the second liquid is applied along the transport direction, the intermediate position being different from the position to which the first liquid is applied along the width direction,
wherein a type of the liquids discharged from the plurality of discharge heads is the same, and
wherein each of the liquids discharged from the plurality of discharge heads is an ink that forms an insulating layer, and a film is formed by discharging the ink from each of the plurality of discharge heads.

2. The film forming method according to claim 1, wherein the plurality of discharge heads includes four or more discharge heads, the four or more discharge heads including a first discharge head and a second discharge head adjacent to the first discharge head along the transport direction, and
wherein a liquid discharged from the first discharge head is applied to a position different from a position to which a liquid discharged from the second discharge head is applied along the transport direction.

3. The film forming method according to claim 1, wherein the material has a plurality of pixels disposed along each of the transport direction and the width direction,
wherein the plurality of discharge heads includes N discharge heads, and
wherein the liquids discharged from adjacent M discharge heads along the transport direction from among the N discharge heads are applied to at least one pixel from among all the plurality of pixels disposed along the width direction, wherein N represents an integer, and M represents an integer equal to or greater than N/2 and less than N/2+1.

4. The film forming method according to claim 1, wherein the material has a plurality of pixels disposed along each of the transport direction and the width direction,
wherein the plurality of discharge heads is capable of applying the liquids to each of the plurality of pixels,
wherein in the applying, at least one of the first to the third liquids is unapplied, and
wherein the pixels corresponding to the at least one unapplied liquid are separated by one or more of the pixels.

5. The film forming method according to claim 1, wherein in the applying, the liquids discharged from two or more discharging heads, from among the plurality of discharging heads, are superimposed on a same region on the material.

6. The film forming method according to claim 1, wherein the material includes an electrode, and
wherein in the applying, the liquids discharged from each of the plurality of discharge heads are applied to different positions on the electrode along the transport direction.

7. The film forming method according to claim 1, wherein the plurality of liquid discharge nozzles includes two nozzle rows, which are shifted along the width direction.

8. The film forming method according to claim 1, wherein the each of the plurality of discharge heads has the plurality of liquid discharge nozzles disposed at a constant nozzle spacing along the direction intersecting the transport direction, the plurality of liquid discharge nozzles includes two nozzle rows, which are shifted along the width direction by a distance of half the nozzle spacing.

9. The film forming method according to claim 1, wherein the insulating layer is formed on an electrode.

10. A film forming device for forming a film on a material to be coated, the film forming device comprising:
a plurality of discharge heads disposed along a transport direction of the material to be transported, the plurality of discharge heads being configured to apply liquids to the material by discharging the liquids, wherein each of the plurality of discharge heads has a plurality of liquid discharge nozzles disposed along a width direction intersecting the transport direction, wherein the plurality of discharge heads each applies a first liquid, a second liquid, and a third liquid, wherein the second liquid is applied to a position substantially equal to a position to which the first liquid is applied along the width direction, wherein the third liquid is applied to an intermediate position between the position to which the first liquid is applied and the position to which the second liquid is applied along the transport direction, the intermediate position being different from the position to which the first liquid is applied along the width direction, wherein a type of the liquids discharged from the plurality of discharge heads is the same, and wherein each of the liquids discharged from the plurality of discharge heads is an ink that forms an insulating layer, and a film is formed by discharging the ink from each of the plurality of discharge heads.

11. The film forming device according to claim 10, wherein the material includes an electrode, and the plurality of discharge heads applies the discharged liquids onto the electrode.

* * * * *